US012519705B2

(12) United States Patent
Park (10) Patent No.: US 12,519,705 B2
(45) Date of Patent: Jan. 6, 2026

(54) METHODS AND SYSTEMS FOR EVALUATING AUDIO QUALITY METRICS USING VOICE ACTIVITY

(71) Applicant: T-Mobile USA, Inc., Bellevue, WA (US)

(72) Inventor: Hyeon Bong Park, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 289 days.

(21) Appl. No.: 18/176,888

(22) Filed: Mar. 1, 2023

(65) Prior Publication Data

US 2024/0297834 A1 Sep. 5, 2024

(51) Int. Cl.
*H04L 41/50* (2022.01)
*H04L 43/0829* (2022.01)
*H04W 24/08* (2009.01)
*H04L 65/65* (2022.01)

(52) U.S. Cl.
CPC ...... *H04L 41/5087* (2013.01); *H04L 43/0829* (2013.01); *H04W 24/08* (2013.01); *H04L 65/65* (2022.05)

(58) Field of Classification Search
CPC . H04L 41/5087; H04L 43/0829; H04L 65/65; H04L 65/80; H04W 24/08
See application file for complete search history.

(56) References Cited

U.S. PATENT DOCUMENTS

| | | | | |
|---|---|---|---|---|
| 9,641,673 | B2* | 5/2017 | Lu | H04M 3/2236 |
| 11,405,448 | B1* | 8/2022 | Seigneurbieux | H04L 65/612 |
| 2008/0192629 | A1* | 8/2008 | Chari | H04L 47/2408 |
| | | | | 370/230 |
| 2009/0238085 | A1* | 9/2009 | Khanduri | H04L 65/80 |
| | | | | 370/252 |
| 2015/0172455 | A1* | 6/2015 | Lu | H04M 3/2236 |
| | | | | 370/252 |
| 2017/0353598 | A1* | 12/2017 | Cho | H04L 43/0817 |
| 2018/0082704 | A1* | 3/2018 | Xiao | G10L 25/69 |

* cited by examiner

*Primary Examiner* — Fayyaz Alam
(74) *Attorney, Agent, or Firm* — Lee & Hayes, P.C.

(57) ABSTRACT

Methods and systems for evaluating an audio quality using voice activity in a 4G and/or 5G network are disclosed. According to an implementation, a network component may determine that a voice call from a first user to a second user is established in a wireless network. The network component may include a user plane function in a 5G network and/or a serving gateway/packet data network gateway in a 4G network. The network component may obtain an audio stream associated with the voice call periodically until the voice call ends. The network component may further measure a packet loss rate of the audio stream, a muting rate of the audio stream, and a voice activity of the audio stream. The network component may determine whether the user perception of the voice call is impacted based at least in part on the packet loss rate, the muting rate, or the voice activity.

20 Claims, 8 Drawing Sheets

| The Muting threshold currently set to 500 msec | High Voice Activity | | Med-High Voice Activity | | Med-Low Voice Activity | | Low Voice Activity | |
|---|---|---|---|---|---|---|---|---|
| | 20 msec RTP packet interval | | 40 msec RTP packet interval | | 80 msec RTP packet interval | | 160 msec RTP packet interval | |
| # of Packet Loss for 10 second | PLR | Muting | PLR | Muting | PLR | Muting | PLR | Muting |
| 1 | 0.2% | NO | 0.4% | NO | 0.8% | NO | 1.4% | NO |
| 2 | 0.4% | NO | 0.8% | NO | 1.5% | NO | 2.9% | NO |
| 4 | 0.8% | NO | 1.6% | NO | 3.1% | NO | 5.7% | YES* |
| 7 | 1.4% | NO | 2.8% | NO | 5.4% | YES | 10% | YES* |
| 13 | 2.6% | YES | 5.2% | YES | 10% | YES | 18.6% | YES* |
| 25 | 5% | YES | 5% | YES | 19.2% | YES | 35.7% | YES* |

| Correlation of "Voice Activity" vs. "Packet Loss & Muting Rate" ||||
| # of Packet Loss | Voice Activity | Muting Threshold | Muting KPI Impacts |
| --- | --- | --- | --- |
| 1~2 | High (20 msec RTP interval) | 300 msec | No |
| | Low (160 msec RTP interval) | 500 msec | No |
| 3~14 | High (20 msec RTP interval) | 300 msec | Yes |
| | Low (160 msec RTP interval) | 500 msec | No |
| | High (20 msec RTP interval) | 300 msec | No |
| | Low (160 msec RTP interval) | 500 msec | No |
| 15~24 | High (20 msec RTP interval) | 300 msec | Yes |
| | Low (160 msec RTP interval) | 500 msec | Yes |
| | High (20 msec RTP interval) | 300 msec | Yes |
| | Low (160 msec RTP interval) | 500 msec | *No |
| >=25 | High (20 msec RTP interval) | 300 msec | Yes |
| | Low (160 msec RTP interval) | 500 msec | Yes |
| | High (20 msec RTP interval) | 300 msec | Yes |
| | Low (160 msec RTP interval) | 500 msec | Yes |
| | High (20 msec RTP interval) | 300 msec | Yes |
| | Low (160 msec RTP interval) | 500 msec | Yes |

METHODS AND SYSTEMS FOR EVALUATING AUDIO QUALITY METRICS USING VOICE ACTIVITY

Telecommunication networks are widely deployed to provide various services such as voice, data, messaging, video messaging, etc. A core network of a telecommunication network now provides the data service in very high speed and meanwhile, opens up new opportunities for providing the voice service over the internet protocol (VoIP). In an environment where the long-term evolution (LTE), fourth generation (4G) and the fifth generation (5G) coexist, voice over LTE and voice over new radio (NR) are preferred solutions to enable real time voice traffic.

With the voice service sharing the data pipes with other data services such as web browsing or video streaming, the ability to manage the speed, quality, volume, and diameter signaling associated with VOLTE and VoNR is critical for providing a positively differentiated experience. When there is a packet loss in the network connecting the end users, it would directly impact the end users' audio quality. The voice service is much more sensitive than data service in terms of packet loss occurrence as there is no retransmission mechanism for voice service packet whereas data service packet does. Currently, packet loss rate and muting rate of an audio stream are used to measure the audio quality and evaluate the customer's perceptive experience. However, more accurate view of the customer's perceptive experience may be achieved by balancing the packet loss rate with other metrics.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for evaluating audio quality metric in a 4G evolved packet core (EPC) network and a 5G core network are disclosed herein.

In some implementations, a method for evaluating audio quality metric may be implemented on a network component. The network component may be any network component that contributes to establishing and maintaining a voice call session in the network. In some examples, the network component may be a user plane function (UPF) in a 5G core network. In some other examples, the network component may be a serving gateway (SGW) in a 4G EPC network. In yet some other examples, the network component may be a packet data network gateway (PDN gateway or PGW) in the 4G EPC network.

In implementations, the network component may determine that a voice call from a first user equipment to a second user equipment is established in a wireless communication network. The network component may obtain an audio stream associated with the voice call. In some examples, the network component may obtain a preset length of audio stream periodically until the voice call ends. In some examples, a probe coupled to the network component may be configured to detect the real-time protocol (RTP) data packets passing through the network component. In some examples, the probe may decode the RTP data packet and acquire the information indicated in the payload field. As discussed herein, an RTP data packet associated with an active speech may include media codec information in the payload field while an RTP data packet associated with an inactive speech may include a silent insertion descriptor (SID) in the payload field. The probe may thus parse the audio stream into one or more of voice frames and muting frames based at least in part on decoded information in the payload field of the RTP packets.

In implementations, the network component may determine a packet loss rate of the audio stream based at least in part on the sequence numbers of the detected RTP packets during the entire period of the audio stream.

In implementations, the network component may further determine a muting rate of the audio stream based at least in part on a total length of the muting frames in the audio stream.

In implementations, the network component may further determine a voice activity of the audio stream based at least in part on a total number of expected RTP packets during the entire period of the audio stream. The network component may set one or more ranges and/or thresholds to classify the voice activity. A large number in a range may indicate a high voice activity, e.g., a talk spurt. A small number in the range may indicate a low voice activity, e.g., in silence.

In implementations, the network component may determine whether a user perception of the voice call quality is impacted based at least in part on the packet loss rate and the voice activity. When the packet loss rate is high while the voice activity is low, the network component may determine the user perception is not impacted as the lost RTP packets may be mostly silent packets. When the packet loss rate is high and the voice activity is high, the network component may determine the user perception is impacted. The network component may provide the evaluation of the audio quality to a network operation unit to address a potential issue and/or a business analytic unit for further analysis.

The techniques discussed herein may be implemented in a computer network using one or more of protocols including but are not limited to Ethernet, 3G, 4G, 4G/LTE, 5G, 6G, the further radio access technologies, or any combination thereof. In some examples, the network implementations may support architectures, non-standalone architectures, dual connectivity, carrier aggregation, etc. Example implementations are provided below with reference to the following figures.

Figure 1:
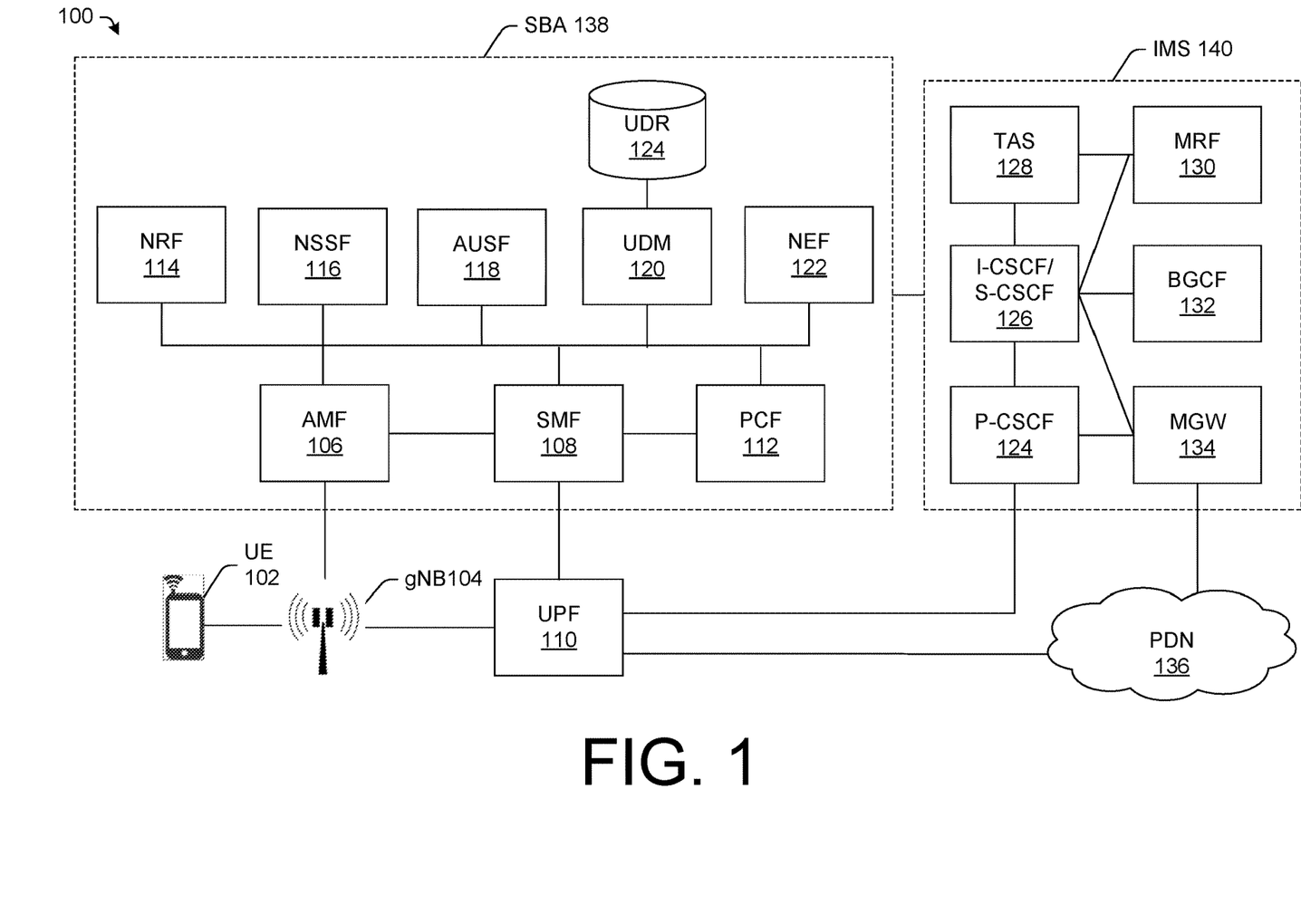
FIG. 1 illustrates an example network scenario, in which methods for evaluating audio quality metrics using voice activity are implemented, according to an example of the present disclosure.

FIG. 1 illustrates an example network scenario, in which methods for evaluating audio quality metrics using voice activity are implemented, according to an example of the present disclosure.

The network scenario 100 may be part of a telecommunication network of a wireless service provider such as, T-Mobile, AT&T, Verizon Wireless, etc. The network scenario 100, as illustrated in FIG. 1, may include a 5G core network, a packet data network (PDN), and one or more access points. The one or more access points may be located in a radio access network (RAN) compatible with various radio access technologies (RATs), such as 5G NR, 4G/LTE, HSDPA/HSPA+, UMTS, CDMA, GSM, WiMAX, Wi-Fi, and/or any other previous or future generation of radio access technology. A user equipment (UE) 102 may connect to the 5G core network via a gNB 104 that is compatible with 5G NR. Although not shown, the network scenario 100 may also include other base stations, for example, eNB that is compatible with 4G/LTE, 2G and 3G base stations that are compatible with GSM and CDMA, respectively.

By way of example and without limitation, the 5G core network may include a plurality of network components such as an access and management function (AMF) 106, a session management function (SMF) 108, a user plane function (UPF) 110, a policy control function (PCF) 112, a network repository function (NRF) 114, a network slice selection function (NSSF) 116, an authentication server function (AUSF) 118, a unified data management (UDM) 120, a network exposure function (NEF) 122, and a unified data repository (UDR) 124, etc. In some examples, the AMF 106, the SMF 108, the PCF 112, the NRF 114, the NSSF 116, the AUSF 118, the UDM 120, the NEF 122, and the UDR 124 may form a service based architecture (SBA) 138 in the 5G core network.

The AMF 106 may manage the access of the UE to the 5G core network and the data exchange between the UE and the PDN. The SMF 108 may interact with the decoupled data plane, perform PDU session management, and manage session context with UPF 110. The UPF 110 interconnects the PDN in the 5G environment and plays a critical role in data transfer. In some examples, the UPF 110 may be responsible for packet routing and forwarding, packet inspections, QoS (Quality of Service) handling, and act as an anchor point for intra RAT and inter RAT mobility. The PCF 112 may use the policy subscription information stored in the UDR 124 to provide policy rules to SMF 108 and AMF 106. In some examples, the PCF 112 may also provide flows based charging control to the SMF 108. The NRF 114 may maintain a list of available network functions instances and their profiles that allow different network functions to register and discover each other via application program interfaces (APIs). The NSSF 116 may be queried by the AMF 106 to assist with the selection of the network slice instances that will serve a particular UE. The NSSF 116 may determine the allowed network slice selection assistance information (NSSAI) that is supplied to the device. In some examples, the NSSF 116 may be used to allocate an appropriate AMF if the current AMF is not able to support all network slice instances for a given UE. The AUSF 118 supports the AMF 106 to authenticate the UE. The UDM 120 may generate authentication credentials used during the authentication process and authorize network access and roaming based on user subscriptions. The NEF 122 may be configured to expose services and resources over APIs within and outside the 5G core network, enabling third-party developers and enterprises to create and tailor their own composite or specialized network services on-demand. The UDR 124 is a centralized database that stores the subscription information and can be used to serve other network functions. For example, the UDM 120 may use the UDR 124 to store and retrieve the subscription data.

As discussed herein, frequency bands for the 5G NR may be separated into two different frequency ranges. Frequency Range 1 (FR1) includes frequency bands from 450 MHz to 6 GHZ, some of which overlaps the LTE frequency range. Frequency Range 2 (FR2) includes frequency bands from 24.25 GHz to 52.6 GHz.

In implementations, the network functions of the 5G core network may communicate with each other on different interfaces. For instance, the AMF 106 may communicate with the SMF 108 on N11 interface, the AUSF 118 on N12 interface, the NSSF 116 on N22 interface, and the UDM 120 on N8 interface, etc. The SMF 108 may communicate with the UPF 110 on N4 interface, the UDM 120 on N10 interface, and the PCF 112 on N7 interface, etc.

The PDN 136 may be a public data network established for providing data services for the public. A PDU session may be established between the UE 102 and the PDN 136 for data services. In some examples, the network scenario 100 may further include an IP multimedia system (IMS) 140 that delivers the voice services (e.g., VoIP) to the UE 102 over the PDN 136. By way of example and without limitation, the IMS 140 may include a proxy call session control function (P-CSCF) 124, an interrogating CSCF (I-CSCF) and a serving CSCF (S-CSCF) 126, a telephony application server (TAS) 128, a media resource function (MRS) 130, a breakout gateway control function (BGCF) 132, and a media gateway (MGW) 134, etc.

In the IMS 140, the P-CSCF 124 may be an edge access function and an entry point for the UE 102 to request services from the IMS 140. The I-CSCF may be responsible for onward routing of session initiation protocol (SIP) messages to the appropriate S-CSCF for a given subscriber. In some examples, the I-CSCF may query a home subscriber server (not shown) to discover the S-CSCF that a particular subscriber has been assigned to. Although shown in FIG. 1 as one component 126, the I-CSCF and the S-CSCF can be implemented in separate computing devices or servers. The TAS 128 may provide supplementary multimedia services to the subscribers such as caller ID service, origination-denial, termination-denial, call forwarding, etc. The MRF 130, in conjunction with the I-CSCF/S-CSCF 126 and the TAS 128, may be responsible for carrying out a variety of processing tasks on media streams associated with some particular services. The BGCF 132 may determine the network where PSTN breakout happens. If the breakout is to occur in the same network as the BGCF, the BGCF 132 may select a media gateway control function (MGCF) responsible for the interworking with the public switched telephone network (PSTN). The MGW 134 may be configured to handle the voice bearer as part of an IP based call. Controlled by the MGCF, the MGW 134 may provide media stream termination, transcoding and conversion services, etc.

As discussed herein, the voice service and the data service provided through the PDN 136 may share the bandwidth of the core network and/or the radio access networks. Comparing to the data services, the loss of the voice service packets in the network may greatly impact the user's audio quality as there is no retransmission for the voice service packets. Some network components may be configured to monitor the voice data streams, capture the data packets transmitted on the downlink and/or the uplink for the voice data transmission and evaluate the audio quality for a voice call. If it is determined that the audio quality, in terms of packet loss rate and/or muting rate, is deteriorated, the network component may generate a report, alerting to a network operation unit regarding a potential issue. In some examples, the audio quality evaluation may be performed by the UPF of the 5G core network (e.g., the UPF 110 of FIG. 1). In implementations, a probe may be coupled to the UPF 110 to capture the data packets transmitted in the bearer. The UPF 110 may determine a packet loss rate of an audio stream in a preset time period and repeat the evaluation until the voice call ends.

In some examples, the probe coupled to the UPF 110 may detect the data packets on N3 interface between the UPF 110 and the gNB 104. In some other examples, the probe coupled to the UPF 110 may detect the data packets on N6 interface between the UPF 110 and the P-CSCF 124.

Figure 2:
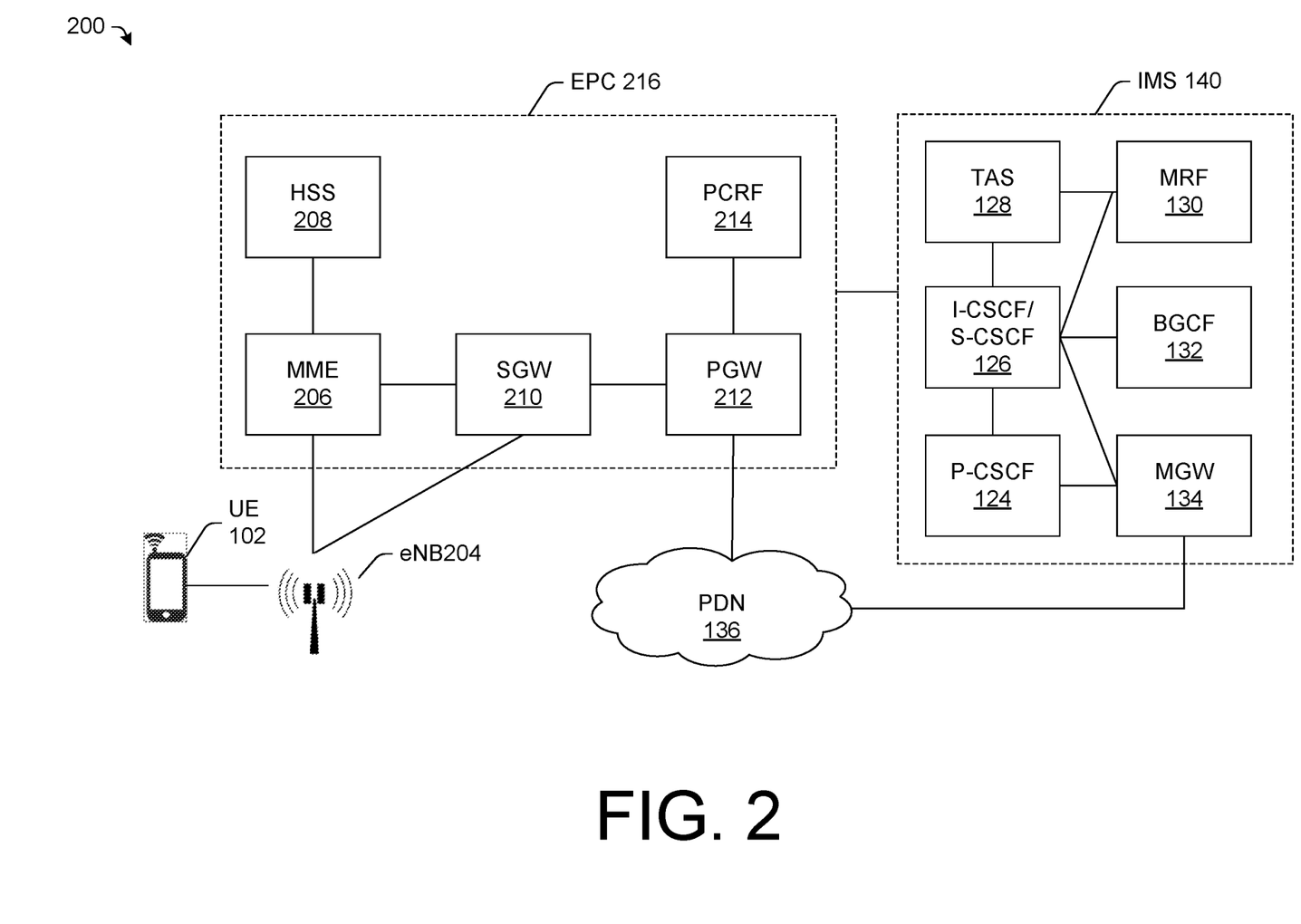
FIG. 2 illustrates another example network scenario, in which methods for evaluating audio quality metrics using voice activity are implemented, according to an example of the present disclosure.

FIG. 2 illustrates another example network scenario, in which methods for evaluating audio quality metrics using voice activity are implemented, according to an example of the present disclosure.

The network scenario 200, as illustrated in FIG. 2, may include a 4G evolved packet core (EPC) network 216, the PDN 136, the IMS 140, and one or more access points. The UE 102 may connect to the 4G EPC network via an eNB 204. The 4G EPC network may include a plurality of network components such as a mobility management entity (MME) 206, a home subscriber server (HSS) 208, a serving gateway (SGW) 210, a PDN gateway (PGW) 212, a policy and charging rules function (PCRF) 214, etc.

The MME 206 may be configured to provide mobility session management for the 4G EPC network and support subscriber authentication, roaming and handovers to other networks. The functions of the MME 206 may be mapped to the AMF in the 5G core network (e.g., the AMF 106 of FIG. 1). The HSS 208 is a central database that contains all relevant details about subscriber information and user authentication. The HSS 208 also provides information for calls and IP session set up. In the 5G core network, the function of the HSS 208 may be mapped to the UDM (e.g., the UDM 120 of FIG. 1). The SGW 210 may be configured to route the data packets from the eNB 204 to the PGW 212 or vice versa. The SGW 120 may include a user plane function SGW-U and a control plane function (not shown). The PGW 212 may be configured to act as an interface between the 4G EPC network and the PDN 136. The PGW 212 may also include a user plane function and a control plane function (not shown). The PCRF 214 may be configured to determine the policy rules in the IMS network, support service data flow detection, policy enforcement and flow-based charging. The functions of the PCRF 214 may be mapped to the PCF in the 5G core network (e.g., the PCF 112 of FIG. 1).

Similar to the 5G environment, in the 4G environment, the data services may be also provided through the PDN 136 and the voice services may be also provided through the IMS 140 over the PDN 136 (e.g., VoIP service). The PGW 212 and/or the SGW 210 may be further configured to monitor the data streams, acquire the data packets from the data streams and evaluate the audio quality. In some examples, the PGW 212 may monitor the data streams on S5/S8 interface between the PGW 212 and the SGW 210. In some other examples, the SGW 210 may monitor the data streams on S1-U interface between the SGW 210 and the eNB 204.

Figure 3:
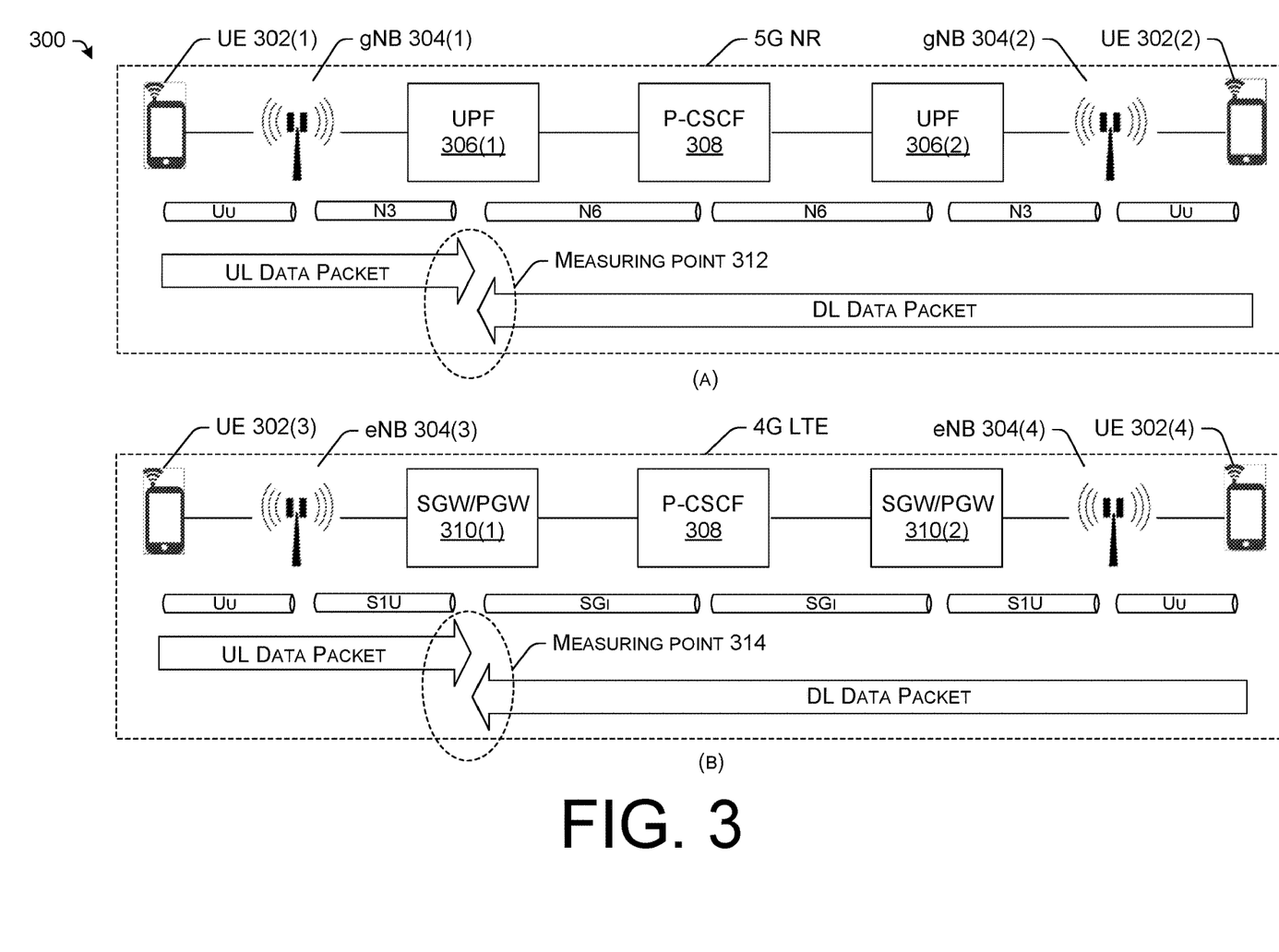
FIG. 3 illustrates yet another example network scenario, in which methods for evaluating audio quality metrics using voice activity are implemented, according to an example of the present disclosure.

FIG. 3 illustrates yet another example network scenario, in which methods for evaluating audio quality metrics using voice activity are implemented, according to an example of the present disclosure. The example network scenario 300 shows the data packet interception schemes implemented in 5G NR and 4G LTE, respectively.

As shown in FIG. 3(a), a voice call originated by the UE 302(1) and terminated at the UE 302(2) may be established in 5G NR. When the caller speaks, the UE 302(1) may pick up the voice signal (e.g., the sound wave), convert the voice signal to digital voice signal, and encode the digital voice signal using certain coding techniques implemented in CODEC. In some examples, the CODEC used in VOLTE and VoNR may include enhanced voice services (EVS), adaptive modulation rate (AMR), adaptive modulation rate-wideband (AMR-WB), etc. These CODECs may have various intervals for real time protocol (RTP) packet transmission. The range of the RTP packet transmission interval may be from 20 msec to 160 msec. The 20 msec RTP packet interval may appear on the talk spurts by the caller or the receiver and the 160 msec RTP packet interval may appear on the silent periods of the caller or the receiver. When the user is on silent, an RTP packet may including a silent insertion descriptor (SID) may be transmitted on the channel.

The encoded voice data packets (e.g., RTP packets) are transmitted to the gNB 304(1) in the 5G RAN and may be further transmitted through multiple network components such as the UPF 306(1) that serves the UE 302(1), the P-CSCF 308, and the UPF 306(2) that serves the UE 302(2). The encoded voice data packets may then be transmitted to the gNB 304(2) in the 5G RAN and delivered to the UE 302(2). Given the UE 302(1) at the caller side as an example, both the uplink (UP) and the downlink (DL) RTP packets may be evaluated at a measuring point 312 implemented by the serving UPF, i.e., the UPF 306(1). In some examples, the UPF 306(1) may include a probe configured to detect the RTP packets passing through. In implementations, the probe may detect the RTP packets on N3 interface between the UPT 306(1) and the gNB 304(1). In other implementations, the probe may detect the RTP packets on N6 interface between the UPT 306(1) and the P-CSCF 308.

As shown in FIG. 3(b), a voice call originated by the UE 302(3) and terminated at the UE 302(4) may be established in 4G LTE. When the caller speaks, the UE 302(3) may pick up the voice signal (e.g., the sound wave), convert the voice signal to digital voice signal, and encode the digital voice signal using certain coding techniques implemented in CODEC. The encoded voice data packets (e.g., RTP packets) are transmitted to the eNB 304(3) in the 4G RAN and may be further transmitted through multiple network components such as the SGW/PGW 310(1) that serves the UE 302(3), the P-CSCF 308, and the SGW/PGW 310(2) that serves the UE 304(4). The encoded voice data packets may then be transmitted to the eNB 304(2) in the 4G RAN and delivered to the UE 302(4). Given the UE 302(3) at the caller side as an example, both uplink and downlink RTP packets may be evaluated at a measuring point 314 implemented by the serving SGW/PGW, i.e., the SGW/PGW 310(1). In some examples, the SGW/PGW 310(1) may include a probe configured to detect the RTP packets passing through.

As discussed herein, the UPF 306(1) or the SGW/PGW 310(1) may measure a packet loss rate, a muting rate, and a voice activity level of the audio stream. In general, high packet loss rate may cause an increase of the muting rate.

Thus, when a high packet loss rate and a high muting rate are observed, the quality of the audio conversation may be deemed as decreasing. In conventional techniques, when the packet loss rate and the muting rate both meet their respective thresholds, the UPF 306(1) or the SGW/PGW 310(1) may forward the RTP packets and the measurements to a network operation unit and/or a business unit for further analysis. However, in some circumstances, the packet loss may occur during a low voice activity period, when the user is mostly in silent. Even if the packet loss rate is high, it may not affect the user's perceptive experience because the lost RTP packets are silent packets (e.g., SIDs). The UPF 306(1) or the SGW/PGW 310(1) may further measure the voice activity level of the audio stream and provide a more accurate evaluation of the audio quality.

It should be understood that the network scenarios and the measuring schemes shown in FIG. 3 are for the purpose of illustration. The present disclosure is not intended to be limiting. The audio quality evaluation may also be performed by the UPF or SGW/PGW serving the recipient UE, e.g., the UPF 306(2) or the SGW/PGW 310(2).

Figure 4A:
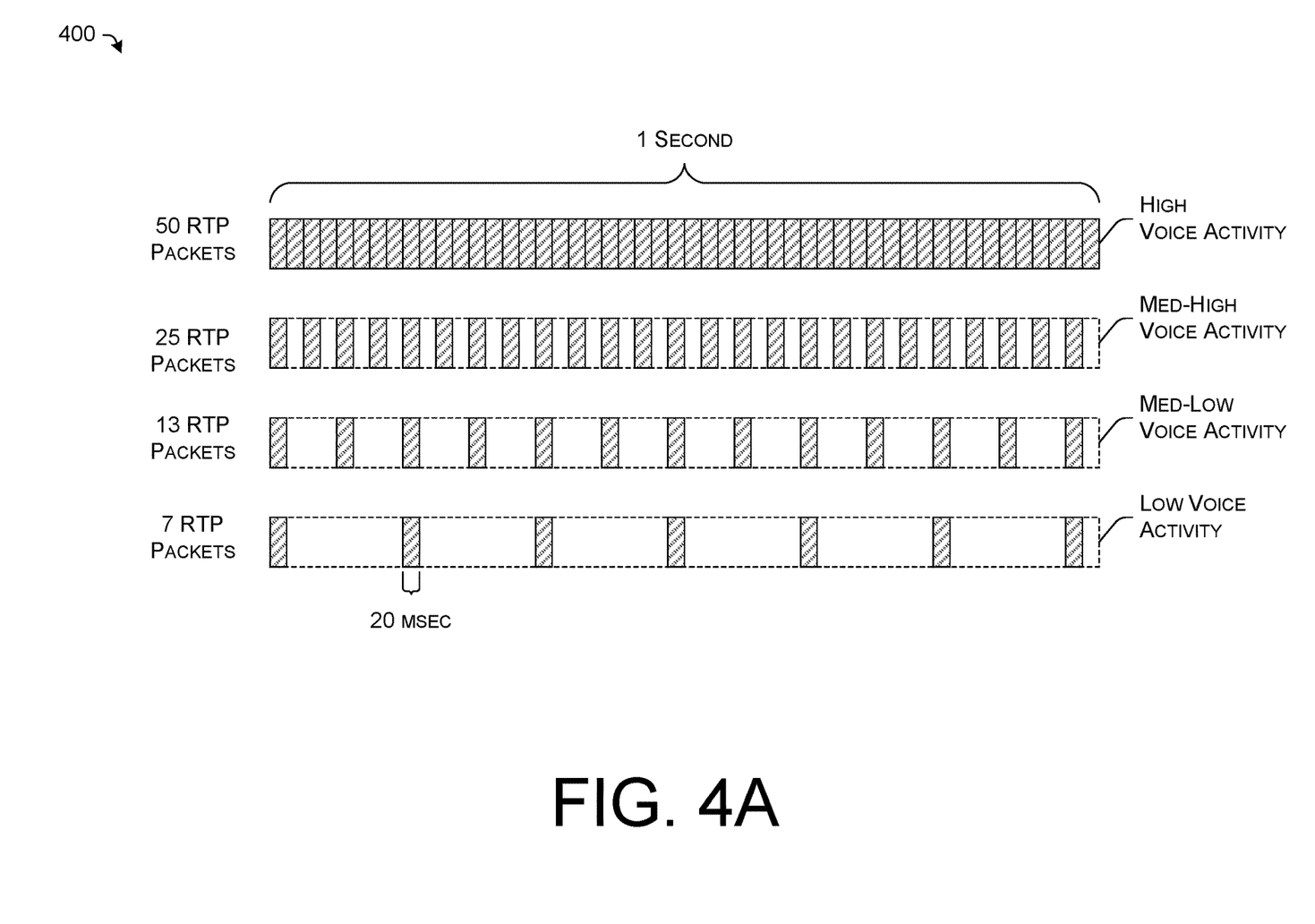
FIG. 4A illustrates an example scenario, in which voice activity is measured for an audio stream, according to an example of the present disclosure.

FIG. 4A illustrates an example scenario, in which voice activity is measured for an audio stream, according to an example of the present disclosure.

The example scenario 400 shows a one second audio stream. In a high voice activity example, the RTP packet transmission interval is 20 msec and 50 RTP packets are transmitted in the one second audio stream. In a med-high voice activity example, the RTP packet transmission interval is 40 msec and 25 RTP packets are transmitted in the one second audio stream. In a med-low voice activity example, the RTP packet transmission interval is 80 msec and 13 RTP packets are transmitted in the one second audio stream. In a low voice activity example, the RTP packet transmission interval is 160 msec and 7 RTP packets are transmitted in the one second audio stream. As discussed herein, the high voice activity may indicate the user is in talk spurt and the low voice activity may indicate the user is in silence.

Figure 4B:
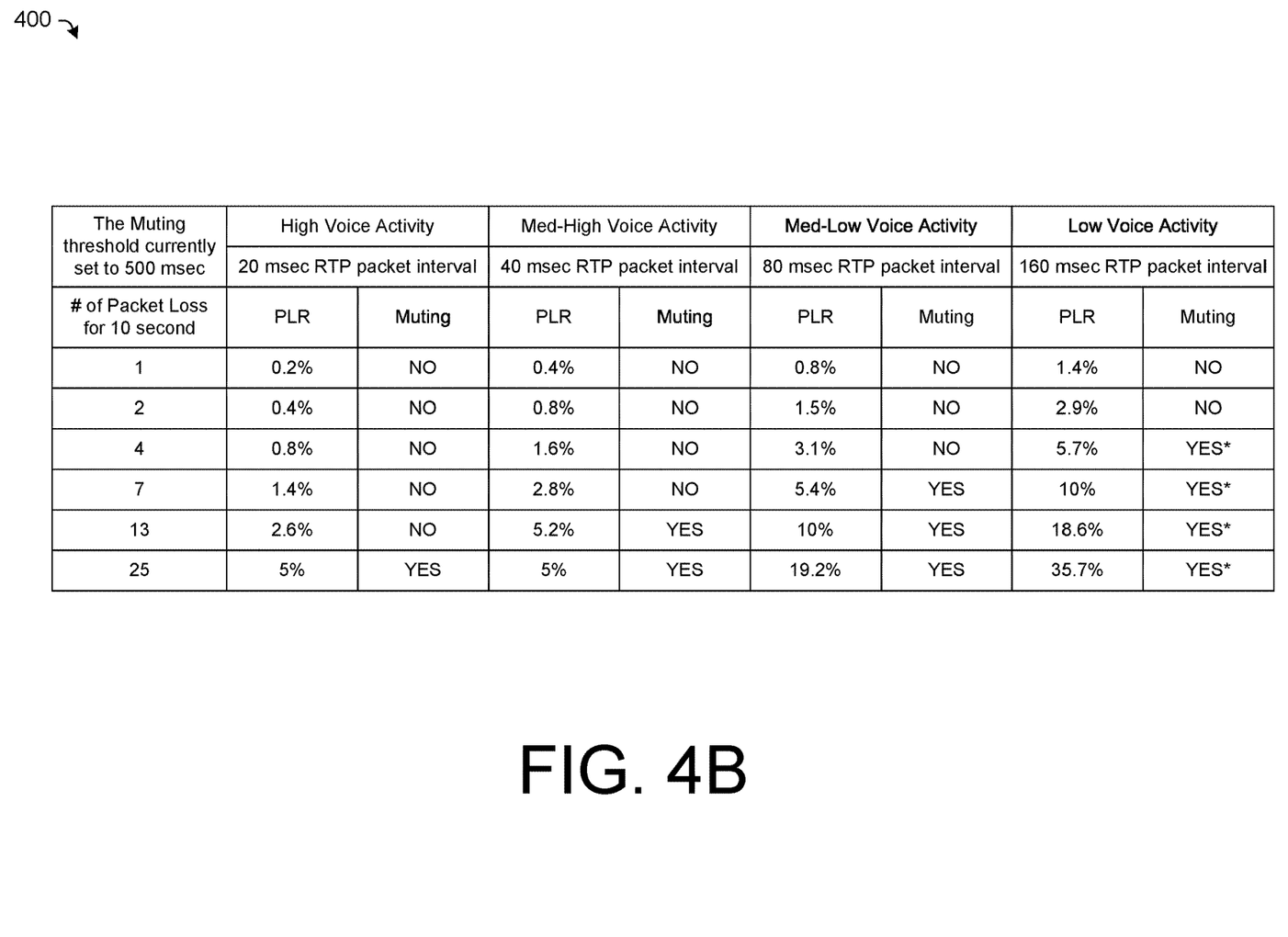
FIG. 4B illustrates an example scenario, in which voice quality is evaluated for an audio stream, according to an example of the present disclosure.

FIG. 4B illustrates an example scenario, in which voice quality is evaluated for an audio stream, according to an example of the present disclosure.

As shown in FIG. 4B, in high voice activity situation, the packet loss rate (PLR) lower than 5% may not impact the muting rate. However, PLR meeting or exceeding 5% threshold will impact the muting rate in the high voice activity situation. Similarly, in med-high voice activity and med-low voice activity situations, PLR meeting or exceeding 5% threshold will impact the muting rate. In low voice activity situation where the user is on silent, PLR meeting or exceeding 5% threshold still impacts the muting rate but may not impact the user's perception as the lost RTP packets are silent packets (e.g., SIDs). By balancing the measurement of the voice activity, the UPF or the SGW/PGW may obtain a more accurate evaluation of the audio quality in terms of whether it impacts the user's perception of the audio quality.

Figure 4C:
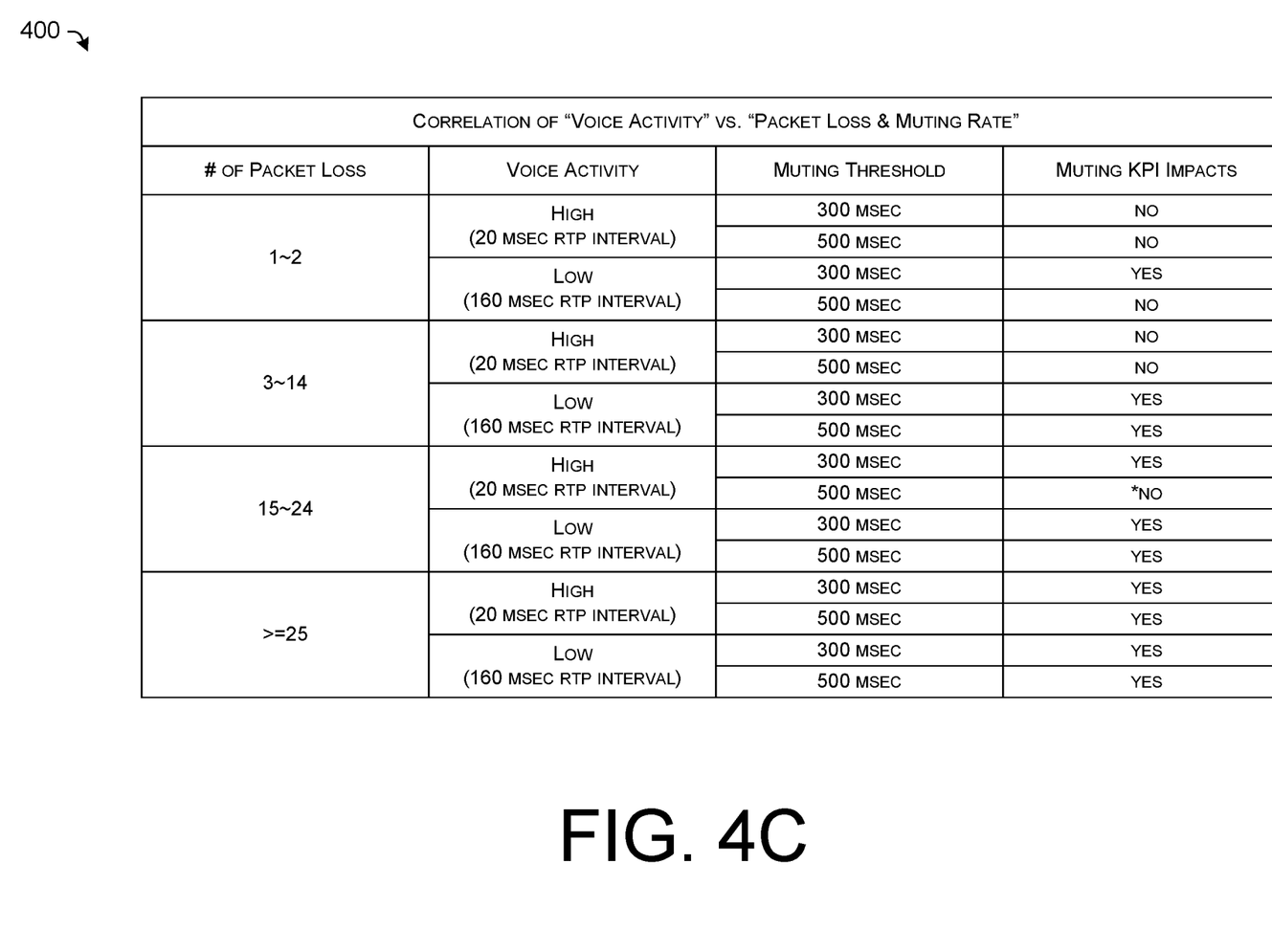
FIG. 4C illustrates an example correlation of the voice activity, the muting rate, and the packet loss rate, according to an example of the present disclosure.

In some examples, in addition to the voice activity level, different muting threshold may also impact the muting KPI, as illustrated in FIG. 4C.

In some examples, the voice activity may be determined based on the expected packets and the duration of the audio stream. Equation (1) shows an example calculation of the voice activity.

$$\text{Voice Activity} = \frac{\text{Expected packets}}{\text{Total stream duration}} * 2000 \quad (1)$$

In some examples, the UPF or the SGW/PGW may obtain the sequence number of the detected RPT packets. The expected packets may be determined as the sequence number of the last RTP packet of the stream minus the sequence number of the first RTP packet of the stream plus one. The total stream duration may be the duration of the entire call in milliseconds. Table 1 shows an example voice activity computed using Equation (1). The voice activity computed using Equation (1) may fall in a range of 0 to 100.

TABLE 1

Voice Activity

| Voice Activity | Number of RTP packets transmitted per second | Description |
| --- | --- | --- |
| 100 | 50 | Highest voice activity |
| 70 | 35 | Med-High voice activity |
| 50 | 25 | Med voice activity |
| 14 | 7 | Lowest voice activity |

As illustrated in Table 1, the highest voice activity having 50 RTP packets transmitted per second is denoted by value 100, the med-high voice activity having 35 RTP packets transmitted per second is denoted by value 70, the med voice activity having 25 RTP packets transmitted per second is denoted by value 50, and the lowest voice activity having 7 RTP packets transmitted per second is denoted by value 14.

It should be understood that the calculation of the voice activity is for the purpose of illustration. The present disclosure is not intended to be limiting. The voice activity levels may be denoted by other ranges and/or thresholds.

Figure 5:
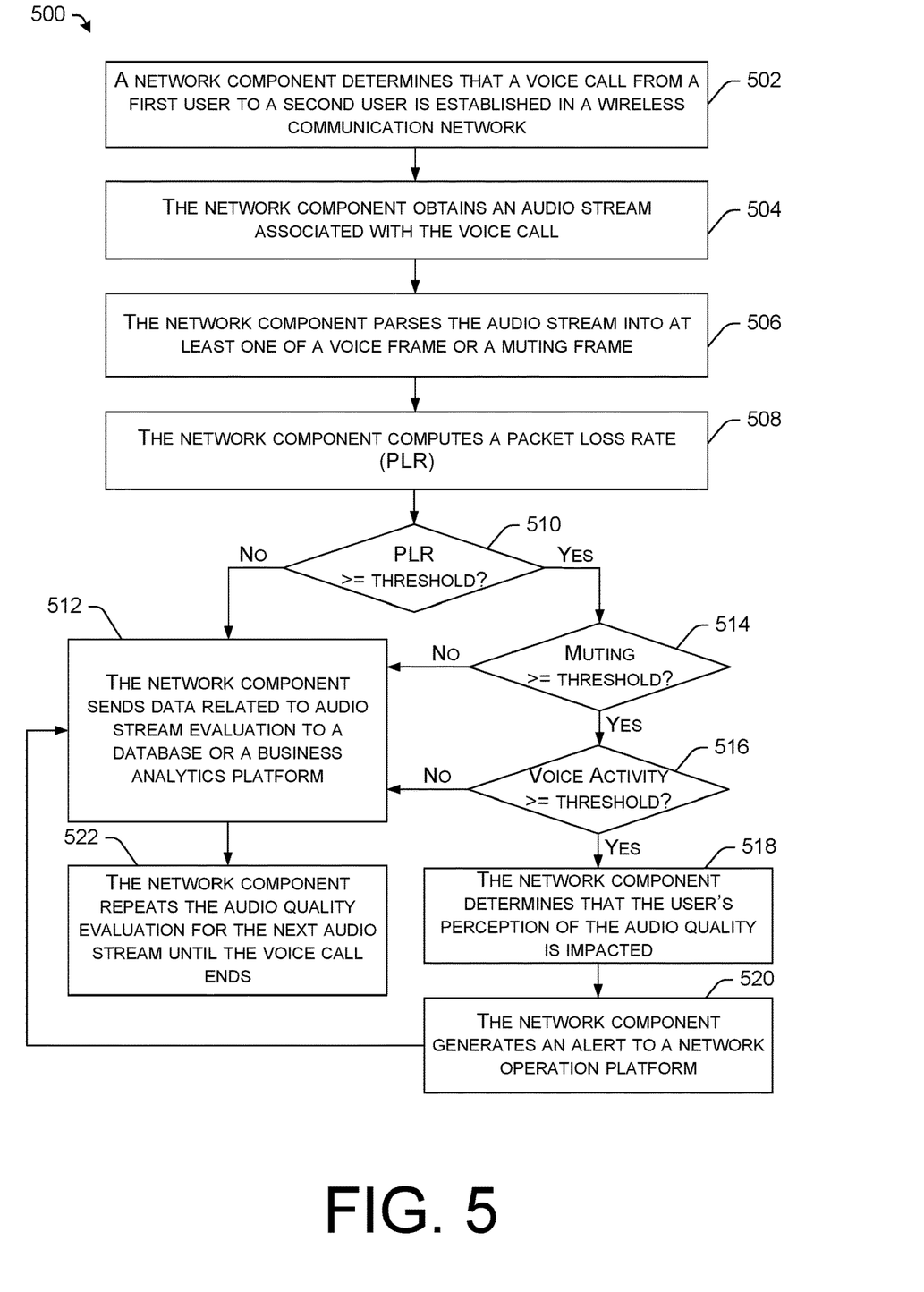
FIG. 5 illustrates an example flowchart for evaluating audio quality metrics using voice activity, according to an example of the present disclosure.

FIG. 5 illustrates an example flowchart for evaluating audio quality metrics using voice activity, according to an example of the present disclosure.

At operation 502, a network component may determine that a voice call from a first user to a second user is established in a wireless communication network. The network component may be any component or network function that operates to establish and maintain the voice call session between the first user and the second user. In some examples, the network component may include a user plane function in the 5G core network, e.g., UPF 110 in FIG. 1, UPF 306(1) and 306(3) in FIG. 3, etc. In some other examples, the network component may include a serving gateway and/or a PDN gateway in the 4G EPC network, e.g., SGW 210 and/or PGW 212 in FIG. 2, SGW/PGW 310(1) and 310(2) in FIG. 3, etc.

At operation 504, the network component may obtain an audio stream associated with the voice call. The network component may obtain an audio stream of a preset length periodically during the voice call. For example, the network component may acquire a data stream every 20 seconds during the voice call. In implementations, a probe may detect the RTP packets transmitted through the network component. In a 4G LTE environment, for example, the probe may be coupled to the PDN gateway to detect the RTP packets on the S5/S8 interface between the PDN gateway and the serving gateway. In another example in the 4G LTE environment, the probe may be coupled to the serving gateway to detect the RTP packets on the S1-U interface between the serving gateway and the eNodeB, e.g., between the SGW 210 and the eNB 204 of FIG. 2.

At operation 506, the network component may parse the audio stream into one or more of voice frames or muting frames. An RTP packet associated with active speech may generally include a sequence number used to detect lost packets a payload describing the specific media codec, a frame indication marking the beginning and the end of the frame, a source field that identifies the originator of the frame, etc. An RTP packet associated with inactive speech or silence may indicate a silent insertion descriptor (SID) in the payload. The probe coupled to the network component may retrieve the payload information from an RTP packet and determine whether the RTP packet is a voice frame or a muting frame.

At operation 508, the network component may compute a packet loss rate (PLR). As discussed herein, each RTP packet includes a sequence number. The network component may compute the packet loss rate based on the sequence numbers of detected RTP packets.

At operation 510, the network component may determine whether the packet loss rate is equal to or greater than a threshold. In some examples, the threshold may be set as 5% of the expected RTP packets in the audio stream. In some examples, the threshold may be set based on the types of services.

When the packet loss rate is less than the threshold, at operation 512, the network component may send data related to audio stream evaluation to a database or a business analytics platform. In general, the packet loss rate being less than the threshold may indicate that the audio quality is at an acceptable level to the users. The data related to audio stream evaluation may include the detected RTP packets and the computed packet loss rate.

At operation 522, the network component may repeat the audio quality evaluation for the next audio stream until the voice call ends. As discussed herein, the audio quality evaluation may repeat the operations of 504, 506, 508, 510, and 512, as described above.

When the packet loss rate is equal to or greater than the threshold, at operation 514, the network component may determine whether the muting rate is equal to or greater than a threshold. In some examples, the muting rate may be set as 500 msec in a one second audio stream. In some other examples, the muting rate may be set as 300 msec in a one second audio stream. In yet some other examples, the muting rate may be chosen as a percentage of a muting period in an audio frame. The muting rate may also be chosen based on the types of the services such as, whether it is an audio conversation or a video conversation.

When the muting rate is less than the threshold, the network component may determine the quality of the audio conversation is normal and perform the operations 512 and 522, as described above.

When the muting rate is equal to or greater than a threshold, at operation 516, the network component may determine whether a voice activity is equal to or greater than a threshold.

As discussed herein, when the voice activity of the user is low, i.e., in silence, the lost RTP packets may mostly be silent packets. Even the packet loss rate exceeds the threshold causing high muting rate, it may not impact the user's audio conversation with another user. When the voice activity is less than the threshold, the network component may determine the audio quality of the voice call is acceptable and perform the operations 512 and 522, as described above.

When the voice activity is equal to or greater than the threshold, at operation 518, the network component may determine that the user's perception of the audio quality is impacted. As discussed herein, during an active speech period, high RTP packet loss rate may cause intermittent speech heard by the recipient. The network component may generate an alert to a network operation platform, at operation 520. Based on the evaluations of the packet loss rate, the muting rate, and the voice activity, the network component may alert to the network operation platform about potential issues. The network work component may further send the data related to the evaluations to a database or a business analytics platform and repeat the audio quality evaluation until the voice call ends, described in operations 512 and 522.

Figure 6:
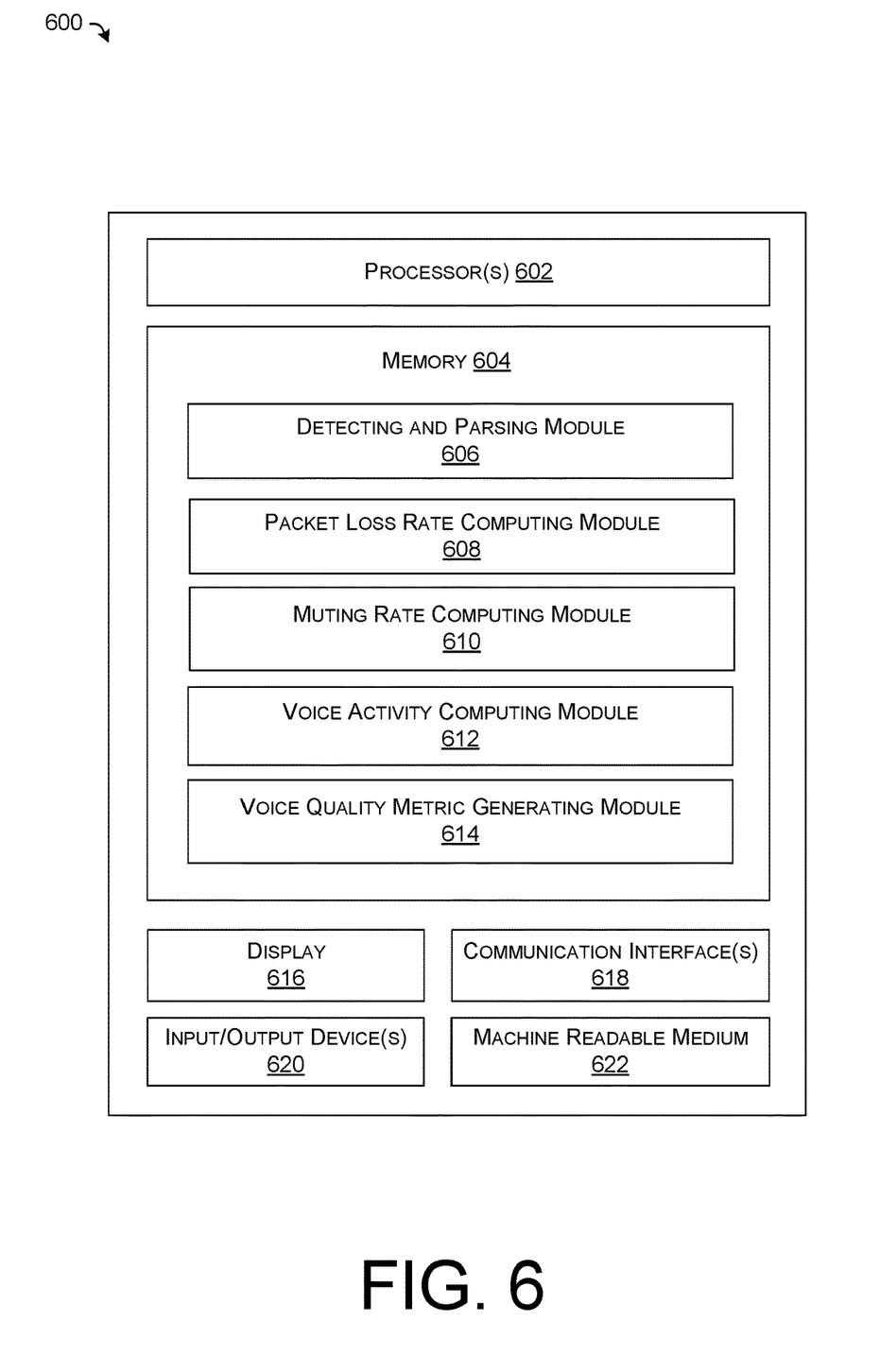
FIG. 6 illustrates an example network component, in which methods for evaluating audio quality metrics using voice activity are implemented, according to an example of the present disclosure.

FIG. 6 illustrates an example network component, in which methods for evaluating audio quality metrics using voice activity are implemented, according to an example of the present disclosure. The example network component 600 may correspond to any component or network function that operates to establish and maintain the voice call session in the 4G EPC network and/or a 5G core network. In some examples, the network component may include a user plane function in a 5G core network such as UPF 110 in FIG. 1, UPF 306(1) and 306(3) in FIG. 3, a serving gateway and/or a PDN gateway in a 4G EPC network such as SGW 210 and/or PGW 212 in FIG. 2, and SGW/PGW 310(1) and 310(2) in FIG. 3.

As illustrated in FIG. 6, the network component 600 may comprise processor(s) 602, a memory 604 storing a detecting and parsing module 606, a packet loss computing module 608, a muting rate computing module 610, a voice activity computing module 612, and a voice quality metric generating module 614, a display 616, communication interface(s) 618, input/output device(s) 620, and/or a machine readable medium 622.

In various examples, the processor(s) 602 can be a central processing unit (CPU), a graphics processing unit (GPU), or both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in memory 604, which can be associated with common types of volatile (RAM) and/or nonvolatile (ROM) memory.

In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the network component 600. Any such non-transitory computer-readable media may be part of the network component 600.

The detecting and parsing module 606 may be configured to detect the packets transmitting through the network component. In some examples, the detecting and parsing module 606 may detect the packets at an interface between the network component and another network component in the packet transmission channel. In yet other examples, the detecting and parsing module 606 may detect the packets at an interface between the network component and a base station, a node B, etc. For example, the detecting and parsing module 606 may detect the packets at the interface between an UPF and a P-CSCF in a 5G core network. In another example, the detecting and parsing module 606 may detect the packets at the interface between an UPF and a gNode B in the 5G environment. In yet another example, the detecting and parsing module 606 may detect the packets at the interface between an SGW and a PGW in a 4G EPC network. In yet other examples, the detecting and parsing module 606 may detect the packets at the interface between an SGW and an eNode B in a 4G environment.

The detecting and parsing module 606 may be configured to parse the audio stream into one or more of a voice frame and a muting frame based on the information in the payload field of the data packets. For example, an RTP packet of an active speech may include the information of media codec in the payload field while an RPT packet of an inactive speech may include a silent insertion descriptor in the payload field.

The packet loss computing module 608 may be configured to compute a packet loss rate of the audio steam. As discussed herein, each RTP packet may include a sequence number. The packet loss computing module 608 may record the sequence numbers of the detected RTP packets and compute a packet loss rate based on the sequence numbers recorded for the entire audio stream period.

The muting rate computing module 610 may be configured to computing a muting rate of the audio stream. The muting rate computing module 610 may acquire the muting frames detected by the detecting and parsing module 606 and accumulate the length of all detected muting frames. The muting rate computing module 610 may determine the muting rate based on the length of all detected muting frames and the total stream duration.

The voice activity computing module 612 may be configured to compute a voice activity level of the audio stream based at least in part on the number of packets being detected and the total stream duration. The voice activity computing module 612 may rely on the sequence number of the first detected RTP packet of the stream and the sequence number of the last detected RTP packet of the stream to estimate a total number of expected RTP packets during the stream. The voice activity computing module 612 may configure one or more thresholds and/or ranges to classify the voice activity into different levels.

The voice quality metric generating module 614 may generate a voice quality metric based on the packet loss rate, the muting rate, and the voice activity. The voice quality metric generating module 614 may provide the voice quality metric to a network operation unit or a business analytic unit for further analysis.

The communication interface(s) 618 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 618 can be compatible with multiple radio access technologies, such as 5G radio access technologies and 4G/LTE radio access technologies. Accordingly, the communication interfaces 618 can allow the network component 600 to connect to the 5G system described herein.

Display 616 can be a liquid crystal display or any other type of display commonly used in the network component 600. For example, display 616 may be a touch-sensitive display screen and can then also act as an input device or keypad, such as for providing a soft-key keyboard, navigation buttons, or any other type of input. Input/output device (s) 620 can include any sort of output devices known in the art, such as display 616, speakers, a vibrating mechanism, and/or a tactile feedback mechanism. Input/output device(s) 620 can also include ports for one or more peripheral devices, such as headphones, peripheral speakers, and/or a peripheral display. Input/output device(s) 620 can include any sort of input devices known in the art. For example, input/output device(s) 620 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 622 can store one or more sets of instructions, such as software or firmware, that embodies any one or more of the methodologies or functions described herein. The instructions can also reside, completely or at least partially, within the memory 604, processor(s) 602, and/or communication interface(s) 618 during execution thereof by the network component 600. The memory 604 and the processor(s) 602 also can constitute machine readable media 622.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method comprising:
   determining that a voice call from a first user equipment to a second user equipment is established in a wireless communication network;
   obtaining an audio stream associated with the voice call;
   determining a first quality metric of the audio stream;
   determining a feature of the audio stream, the feature including a voice activity level determined based at least in part on expected data packets in the audio stream; and
   determining that a user perception of the voice call is impacted based at least in part on the first quality metric and the feature of the audio stream.

2. The computer-implemented method of claim 1, wherein the first quality metric of the audio stream is a packet loss rate, and the computer-implemented method further comprises:
   computing the packet loss rate of the audio stream based at least in part on a number of data packets received in the audio stream; and
   computing a muting rate of the audio stream based at least in part on a length of a muting period and a length of the audio stream.

3. The computer-implemented method of claim 2, further comprising:
   determining a number of the expected data packets in the audio stream; and
   determining the voice activity level based at least in part on the number of the expected data packets in the audio stream.

4. The computer-implemented method of claim 3, further comprising:
   in response to the packet loss rate being equal to or greater than a first threshold, and the voice activity level being equal to or greater than a second threshold,
   determining that the user perception of the voice call is impacted.

5. The computer-implemented method of claim 3, further comprising:
   in response to the packet loss rate being equal to or greater than a first threshold, and the voice activity level being equal to less than a second threshold,
   determining that the user perception of the voice call is not impacted.

6. The computer-implemented method of claim 3, further comprising:
   in response to the packet loss rate being equal to or greater than a first threshold, and the voice activity level being equal to or greater than a second threshold,
   determining that the muting rate is impacted.

7. The computer-implemented method of claim 3, further comprising:
   parsing the audio stream into at least one of a voice frame or a muting frame;
   computing the packet loss rate based at least in part on the number of data packets received in the voice frame; and
   computing the muting rate based at least in part on a length of the muting frame and the length of the audio stream.

8. The computer-implemented method of claim 7, further comprising:
   determining a first sequence number of the data packets received in the audio stream;
   determining a last sequence number of the data packets received in the audio stream; and
   determining the number of the expected data packets based at least in part on the first sequence number and the last sequence number.

9. A system comprising:
   a processor,
   a network interface, and
   a memory storing instructions executed by the processor to perform actions including:
   determining that a voice call from a first user equipment to a second user equipment is established in a wireless communication network;
   obtaining an audio stream associated with the voice call;
   determining a first quality metric of the audio stream;
   determining a feature of the audio stream, the feature including a voice activity level determined based at least in part on expected data packets in the audio stream; and
   determining that a user perception of the voice call is impacted based at least in part on the first quality metric and the feature of the audio stream.

10. The system of claim 9, wherein the first quality metric of the audio stream is a packet loss rate, and the actions further include:
    computing the packet loss rate of the audio stream based at least in part on a number of data packets received in the audio stream; and
    computing a muting rate of the audio stream based at least in part on a length of a muting period and a length of the audio stream.

11. The system of claim 10, wherein the actions further include:
    determining a number of the expected data packets in the audio stream; and
    determining the voice activity level based at least in part on the number of the expected data packets in the audio stream.

12. The system of claim 11, wherein the actions further include:
    in response to the packet loss rate being equal to or greater than a first threshold, and the voice activity level being equal to or greater than a second threshold,
    determining that the user perception of the voice call is impacted.

13. The system of claim 11, wherein the actions further include:
    in response to the packet loss rate being equal to or greater than a first threshold, and the voice activity level being equal to less than a second threshold,
    determining that the user perception of the voice call is not impacted.

14. The system of claim 11, wherein the actions further include:
- in response to the packet loss rate being equal to or greater than a first threshold, and the voice activity level being equal to or greater than a second threshold,
- determining that the muting rate is impacted.

15. The system of claim 10, wherein the actions further include:
- parsing the audio stream into at least one of a voice frame or a muting frame;
- computing the packet loss rate based at least in part on the number of data packets received in the voice frame; and
- computing the muting rate based at least in part on a length of the muting frame and the length of the audio stream.

16. The system of claim 15, wherein the actions further include:
- determining a first sequence number of the data packets received in the audio stream;
- determining a last sequence number of the data packets received in the audio stream; and
- determining a number of the expected data packets based at least in part on the first sequence number and the last sequence number.

17. A non-transitory computer-readable storage medium storing computer-readable instructions, that when executed by a processor, cause the processor to perform actions comprising:
- determining that a voice call from a first user equipment to a second user equipment is established in a wireless communication network;
- obtaining an audio stream associated with the voice call;
- determining a first quality metric of the audio stream;
- determining a feature of the audio stream, the feature including a voice activity level determined based at least in part on expected data packets in the audio stream; and
- determining that a user perception of the voice call is impacted based at least in part on the first quality metric and the feature of the audio stream.

18. The non-transitory computer-readable storage medium of claim 17, wherein the first quality metric of the audio stream is a packet loss rate, and the actions further include:
- computing the packet loss rate of the audio stream based at least in part on a number of data packets received in the audio stream; and
- computing a muting rate of the audio stream based at least in part on a length of a muting period and a length of the audio stream.

19. The non-transitory computer-readable storage medium of claim 18, wherein the actions further include:
- determining a number of the expected data packets in the audio stream; and
- determining the voice activity level based at least in part on the number of the expected data packets in the audio stream.

20. The non-transitory computer-readable storage medium of claim 19, wherein the actions further include:
- in response to the packet loss rate being equal to or greater than a first threshold, determining whether the voice activity level meets a criterion;
- in response to the voice activity level being equal to or greater than a second threshold, determining that the user perception of the voice call is impacted; and
- in response to the voice activity level being less than the second threshold, determining that the user perception of the voice call is not impacted.

* * * * *